(12) United States Patent
Palvadi et al.

(10) Patent No.: US 8,993,916 B2
(45) Date of Patent: *Mar. 31, 2015

(54) VARIABLE VENTING AND DAMPING ARC MITIGATION ASSEMBLIES AND METHODS OF ASSEMBLY

(71) Applicant: General Electric Company, Schenectady, NY (US)

(72) Inventors: Srinivas Naga Palvadi, Secunderabad (IN); Ravi Kumar, Secunderabad (IN); Chandrakanth Gopularam, Secunderabad (IN)

(73) Assignee: General Electric Company, Schenectady, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/707,845

(22) Filed: Dec. 7, 2012

(65) Prior Publication Data

US 2014/0160634 A1   Jun. 12, 2014

(51) Int. Cl.
| | |
|---|---|
| H01H 3/60 | (2006.01) |
| H01H 77/00 | (2006.01) |
| H01H 75/00 | (2006.01) |
| H02H 3/00 | (2006.01) |
| H02H 9/00 | (2006.01) |
| H02H 9/06 | (2006.01) |
| H02H 1/00 | (2006.01) |
| H01H 69/00 | (2006.01) |

(Continued)

(52) U.S. Cl.
CPC ............ *H02H 1/0015* (2013.01); *H01H 69/00* (2013.01); *H01H 9/50* (2013.01); *H01T 4/04* (2013.01); *H01T 1/15* (2013.01); *H01T 2/02* (2013.01)

USPC ............... 218/157; 218/155; 218/156; 361/2; 361/54; 361/120

(58) Field of Classification Search
USPC ......... 218/99, 156.157; 219/121.43; 250/310; 313/231, 231.41; 427/534; 438/719
See application file for complete search history.

(56) References Cited

U.S. PATENT DOCUMENTS

| | | | |
|---|---|---|---|
| 2,158,293 A | * | 5/1939 | Lingal .............................. 218/99 |
| 4,516,003 A | | 5/1985 | Yoshiyasu et al. |

(Continued)

OTHER PUBLICATIONS

McBride, John W. et al., "Arc Motion and Gas Flow in Current Limiting Circuit Breakers Operating with a Low Contact Switching Velocity," IEEE Transactions on Components and Packaging Technologies, Sep. 2002.

*Primary Examiner* — Renee S Luebke
*Assistant Examiner* — William Bolton
(74) *Attorney, Agent, or Firm* — General Electric Company

(57) ABSTRACT

Equipment protection systems, arc containment devices, and methods of assembling arc containment devices are disclosed. In one example, an electrical isolation structure includes a conductor base, a cover coupled to the conductor base and defining an isolation chamber, a containment shield disposed on the conductor base within the isolation chamber, and a biasing assembly positioned between the cover and the containment shield. The containment shield defines a containment chamber configured to enclose the plurality of electrode assemblies. The containment shield is configured to at least partially contain the arc products within the containment chamber. The biasing assembly is configured to permit the containment shield to move away from the conductor base to thereby define a gap between the conductor base and the containment shield to enable at least some of the arc gases to vent from the containment chamber.

20 Claims, 7 Drawing Sheets

(51) Int. Cl.
*H01H 9/50* (2006.01)
*H01T 4/04* (2006.01)
*H01T 1/15* (2006.01)
*H01T 2/02* (2006.01)

(56) References Cited

U.S. PATENT DOCUMENTS

| | | | |
|---|---|---|---|
| 4,575,598 A | 3/1986 | Yamagata et al. | |
| 4,689,717 A | 8/1987 | Munzinger et al. | |
| 5,192,841 A | 3/1993 | Milianowicz et al. | |
| 5,403,983 A | 4/1995 | Luoma | |
| 5,689,097 A | 11/1997 | Aufermann et al. | |
| 7,253,379 B2 | 8/2007 | Lakner et al. | |
| 7,529,073 B2 | 5/2009 | Cern | |
| 7,683,795 B2 | 3/2010 | Bjorn | |
| 7,724,489 B2 | 5/2010 | Montich | |
| 7,901,227 B2 | 3/2011 | Hughes | |
| 7,911,747 B2 | 3/2011 | Hyde et al. | |
| 8,278,811 B2 * | 10/2012 | Engel et al. | 313/231.41 |
| 8,563,888 B2 * | 10/2013 | Bohori et al. | 218/157 |
| 2003/0000925 A1 | 1/2003 | Azzola et al. | |
| 2003/0183601 A1 | 10/2003 | Kruschke et al. | |
| 2004/0026377 A1 | 2/2004 | Bach et al. | |
| 2009/0120773 A1 | 5/2009 | Gentsch et al. | |
| 2010/0006544 A1 | 1/2010 | Onufriyenko et al. | |
| 2011/0079583 A1 | 4/2011 | Chen et al. | |
| 2012/0043302 A1 | 2/2012 | Schaltenbrand et al. | |
| 2012/0063036 A1 * | 3/2012 | Robarge et al. | 361/2 |
| 2012/0068602 A1 * | 3/2012 | Roscoe et al. | 315/111.21 |
| 2013/0329325 A1 * | 12/2013 | Ganireddy et al. | 361/56 |

* cited by examiner

VARIABLE VENTING AND DAMPING ARC MITIGATION ASSEMBLIES AND METHODS OF ASSEMBLY

BACKGROUND

The embodiments described herein relate generally to power equipment protection devices and, more particularly, to arc mitigation systems for use in channeling exhaust gases and pressure away from a location of arc generation.

Known electric power circuits and switchgear generally have conductors that are separated by a distance with insulation, such as air, or gas or solid dielectrics. However, if the conductors are positioned too closely together, or if a voltage between the conductors exceeds the dielectic strength of the insulation between the conductors, an arc flash can occur. Arc flash also can occur in case of aging insulations, rodents, and improper maintenance procedures. The insulation between the conductors can become ionized, which makes the insulation conductive and enables arc formation. An arc flash causes rapid release of energy due to a fault between phase conductors, between a phase conductor and a neutral conductor, or between a phase conductor and a ground point. Arc flash temperatures can reach or exceed 20,000° C., which can vaporize the adjacent conductors and burn through the sheets of adjacent equipment panels. In addition, an arc fault is associated with release significant amount of energy in the form of heat, intense light, pressure waves, and/or sound waves due to which heavy damage to the conductors and adjacent equipment can occur. In general fault current and energy associated with an arc event are lower compared to the fault current and energy associated with bolted short circuit fault. Due to inherent delay between the relay closure and the upstream circuit breaker clearing the arc fault, huge damage can occur at fault location. Circuit breaker can be operated using the faster tripping mechanism to reduce the damage. Even with this feature the damage cannot be minimized.

At least some known systems use an arc mitigation system to safely divert fault energy from the location of an arc flash to a safe zone. The arc mitigation system has a containment device/chamber that often includes electrodes or conductors that are separated by a distance and have a sufficient dielectric strength between them to not to cause arc flash without external aid. A plasma generating device is included within the arc containment chamber. When the arc flash event is detected, the plasma device emits ablative plasma towards the electrodes. The ablative plasma reduces electrical impedance between the electrodes, and an electrical arc may be formed between the electrodes. The electrical arc diverts energy from the first arc flash zone to the arc chamber until the arc flash is abated or extinguished. In order to safely transfer and contain energy away from the electrical arc, the arc containment device should not pass excessive current in or through the ground path. The deposition of charged particles from the arc event on the grounded parts of arc mitigation system, generally causes the current flow through ground path. To avoid excessive current flow through ground, additional components such as charge collectors and/or a coating such as epoxy and/or ceramic are used which make the production process complex and also increases the cost.

BRIEF DESCRIPTION

In one aspect, a circuit protection device for use with a circuit that includes at least one pair of conductors is described. The circuit protection device is configured to generate an arc that generates arc products including arc gases. The circuit protection device includes at least one pair of electrode assemblies, a conductor base for mounting the electrode assemblies thereon, a cover coupled to the conductor base and defining at least one isolation chamber, a containment shield disposed on the conductor base within the isolation chamber, and a biasing assembly positioned between the cover and the containment shield and coupled to at least one of the cover and the containment shield. A first electrode assembly of the pair of electrode assemblies is electrically coupled to a first conductor of the at least one pair of conductors, and a second electrode assembly of the pair of electrode assemblies is electrically coupled to a second conductor of the at least one pair of conductors. The at least one pair of electrode assemblies is configured to generate the arc. The pair of electrode assemblies is disposed within the at least one isolation chamber. The containment shield defines a containment chamber enclosing the at least one pair of electrode assemblies. The containment shield is configured to at least partially contain the arc products within the containment chamber. The biasing assembly is configured to permit the containment shield to move away from the conductor base to thereby define a gap between the conductor base and the containment shield to enable at least some of the arc gases to vent from the containment chamber.

In another aspect, an electrical isolation structure is described for use with an arc mitigation device that includes a plurality of electrode assemblies each having an electrode is configured to produce and arc. The arc generates arc products including arc gases. The electrical isolation structure includes a conductor base, a cover coupled to the conductor base and defining an isolation chamber, a containment shield disposed on the conductor base within the isolation chamber, and a biasing assembly positioned between the cover and the containment shield. The containment shield defines a containment chamber is configured to enclose the plurality of electrode assemblies. The containment shield is configured to at least partially contain the arc products within the containment chamber. The biasing assembly is coupled to at least one of the cover and the containment shield. The biasing assembly is configured to permit the containment shield to move away from the conductor base to thereby define a gap between the conductor base and the containment shield to enable at least some of the arc gases to vent from the containment chamber.

In yet another aspect, a method of assembling a circuit protection device for use with a circuit that includes at least one pair of conductors, wherein said circuit protection device includes a conductor base, a containment shield defining a containment chamber, a cover, and at least one pair of electrode assemblies configured to produce an arc is described. The arc generates arc products including arc gases. The method includes securing the at least one pair of electrode assemblies to the conductor base, coupling the containment shield to the cover such that the containment shield is able to move relative to the cover to define a gap between the containment shield and the conductor base to vent arc gases from the containment chamber, coupling the cover to the conductor base such that the at least one pair of electrode assemblies is disposed within the containment chamber and the containment shield is disposed on the conductor base, electrically coupling a first electrode assembly of the pair of electrode assemblies to a first conductor of the at least one pair of conductors, and electrically coupling a second electrode assembly of the pair of electrode assemblies to a second conductor of the at least one pair of conductors.

DETAILED DESCRIPTION

Figure 1:
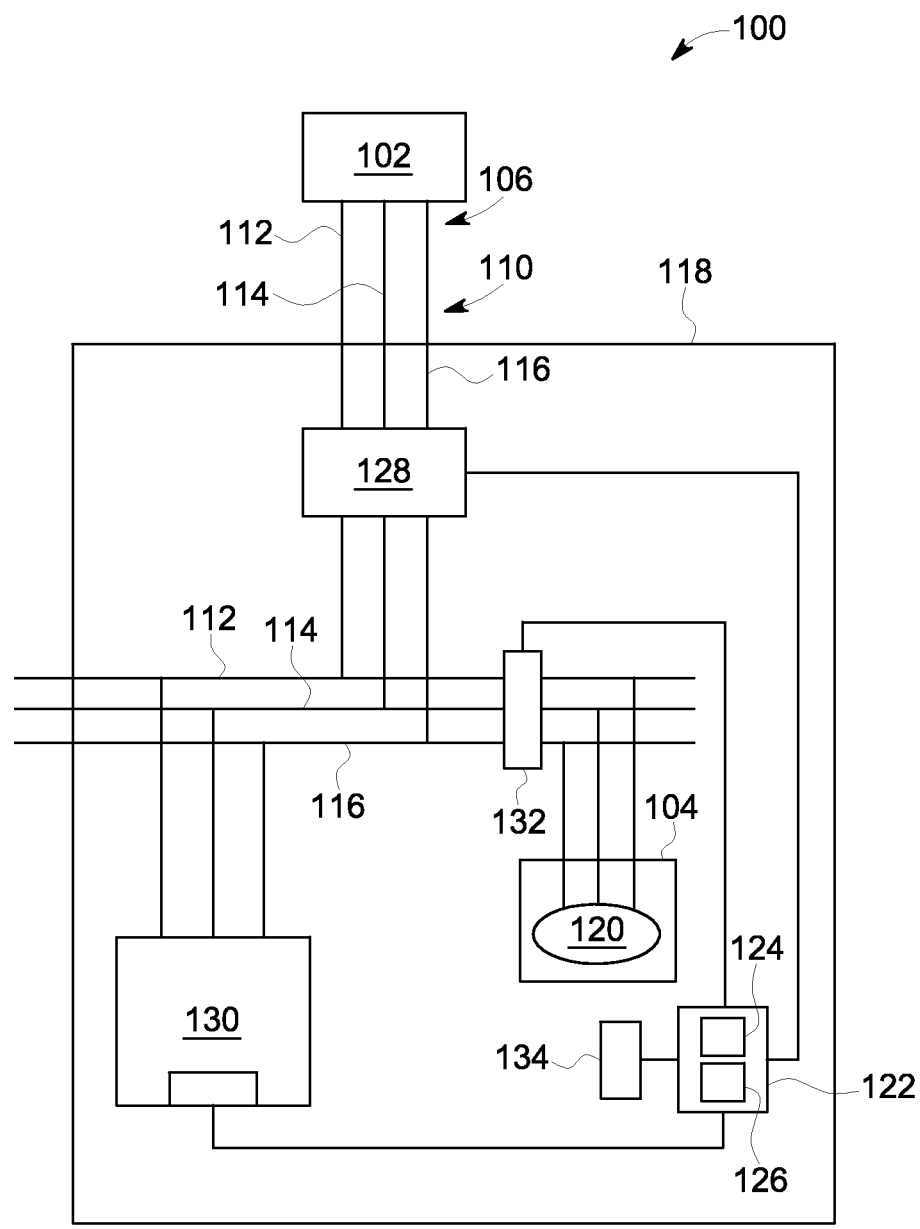
FIG. 1 is a schematic block diagram of an exemplary power distribution system that may be used to distribute electrical power (i.e., electrical current and voltage) received from an electrical power source to one or more loads.

Exemplary embodiments of systems and apparatus for use with a circuit protection are described herein. More particularly exemplary embodiments of systems and apparatus for use in arc mitigation systems are described. These embodiments enhance the flow of ionized gases, heat, metal shrapnel, and pressure out of the circuit protection system after an arc flash is generated. For example, the arc protection system can receive a signal that indicates detection of a primary arc flash within a power system being monitored by the arc protection system. The arc protection system can then generate a secondary arc flash to transfer the energy from the primary arc flash to the arc mitigation system or containment device. Moreover, these embodiments enhance, as appropriate to the rating of the device, the flow of exhaust gases, heat, metal shrapnel, and pressure created by the secondary arc out of an arc containment chamber to the equipment enclosure that contains the arc containment system.

Some exemplary embodiments of an arc containment device include a containment shield within which a secondary arc is created. The containment shield provides a variable venting path for venting gasses, pressure etc. generated by the secondary arc. For example, in some embodiments, the shield is moveably coupled to a cover (which is attached to a conductor base) allowing movement of the containment shield relative to the base. This moveable coupling permits an opening between the bottom of the containment shield and the top of the conductor base that is a venting path for the arc effluents and metal shrapnel. The extent of lift for the containment shield depends on internal pressure developed due to the arc event. The extent of lift defines the vent area for the arc effluents, metal shrapnel and pressure wave. Thereby having a movable mechanism created by mechanism such as spring mechanism between the cover and/or shield and the containment shield causes a variable vent system. In other embodiments mechanisms other than springs are used. For example a compressible material between the top and containment shields, a split containment shield which can move in parts, spring loaded pressure flaps, a damper mechanism between shields, etc. can yield a similar effect. With the variable vent system, a design catering to multiple arc and/or fault currents can be achieved. Moreover, the spring (or other biasing mechanism) can be varied according to the rating of the arc containment device and the desired (or required) venting. Moreover, the placement of the containment shield in a slot in the conductor base and the retention of the containment shield in the slot due to the biasing force limits transport related displacement of the containment shield (i.e., movement of the containment shield when the assembly is moved or otherwise transported). This ensures clearances designed for safe operation of the device dielectrically, are not disturbed during transport. The damping effect provided by the spring or biasing member assembly may also reduce the fastening requirements of the arc containment chamber by dampening the shock pressures created by arc event. Moreover, some embodiments contain bubbled formations or aberrations on the inner surface of containment shield which diffuses the shock pressure wave, thereby reducing the amplification of shock pressure due to reflections from the walls of the containment shield.

FIG. 1 is a schematic block diagram of an exemplary power distribution system 100 that may be used to distribute electrical power (i.e., electrical current and voltage) received from an electrical power source 102 to one or more loads 104. Power distribution system 100 includes a plurality of electrical distribution lines 106 that receive current, such as three phase alternating current (AC), from electrical power source 102. Alternatively, power distribution system 100 may receive any number of phases of current through any suitable number of electrical distribution lines 106 that enables power distribution system 100 to function as described herein.

Electrical power source 102 includes, for example, an electrical power distribution network, or "grid," a steam turbine generator, a gas turbine generator, a wind turbine generator, a hydroelectric generator, a solar panel array, and/or any other device or system that generates electrical power. Loads 104 include, for example, machinery, motors, lighting, and/or other electrical and electromechanical equipment of a manufacturing, power generation, or distribution facility.

Electrical distribution lines 106 are arranged as a plurality of conductors 110. In an exemplary embodiment, conductors 110 include a first phase conductor 112, a second phase conductor 114, and a third phase conductor 116. First phase conductor 112, second phase conductor 114, and third phase conductor 116 are coupled to an equipment protection system 118 for transmitting a first phase of current, a second phase of current, and a third phase of current, respectively, to equipment protection system 118.

In an exemplary embodiment, equipment protection system 118 is a switchgear unit that protects power distribution system 100 and/or loads 104 from an electrical fault that may occur within power distribution system 100. More specifically, equipment protection system 118 electrically disconnects loads 104 from electrical distribution lines 106 (and from electrical power source 102) to interrupt current if an arc flash event 120 is detected, during maintenance, and/or when intentional isolation is required. Alternatively, equipment protection system 118 is any other protection system that enables power distribution system 100 to selectively prevent electrical current from flowing to loads 104.

As used herein, an "arc flash event" refers to a rapid release of energy due to a fault between at least two electrical conductors. Conductors may include conductors that are connected to different phases, a phase and a ground, a phase and a neutral, or between three phases. The rapid release of energy may cause high intensity pressure waves, high temperatures, metal shrapnel, gases, and/or light (collectively referred to herein as "arc products") to be generated proximate the fault, for example, within equipment protection system 118 and/or power distribution system 100.

In an exemplary embodiment, equipment protection system 118 includes a controller 122 that includes a processor 124 and a memory 126 coupled to processor 124. Processor 124 controls and/or monitors operation of equipment protection system 118. Alternatively, equipment protection system 118 includes any other suitable circuit or device for controlling and/or monitoring operation of equipment protection system 118.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Equipment protection system 118 includes a circuit interruption device 128 coupled to first phase conductor 112, second phase conductor 114, and third phase conductor 116. Circuit interruption device 128 is controlled or activated by controller 122 to interrupt current flowing through first phase conductor 112, second phase conductor 114, and third phase conductor 116. In an exemplary embodiment, circuit interruption device 128 includes a circuit breaker, contactor, switch, and/or any other device that enables current to be controllably interrupted by controller 122.

An arc containment device 130, or arc containment device 130, is coupled to circuit interruption device 128 by first phase conductor 112, second phase conductor 114, and third phase conductor 116. In addition, controller 122 is communicatively coupled to arc containment device 130.

In an exemplary embodiment, equipment protection system 118 also includes at least one first, or current, sensor 132 and at least one second or additional sensors 134 such as optical, acoustic, voltage, pressure etc. Current sensor 132 is coupled to, or positioned about, first phase conductor 112, second phase conductor 114, and third phase conductor 116 for measuring and/or detecting the current flowing through conductors 112, 114, and 116. Alternatively, a separate current sensor 132 is coupled to, or positioned about, each of first phase conductor 112, second phase conductor 114, and third phase conductor 116 for measuring and/or detecting the current flowing there through. In an exemplary embodiment, current sensor 132 is a current transformer, a Rogowski coil, a Hall-effect sensor, and/or a shunt. Alternatively, current sensor 132 may include any other sensor that enables equipment protection system 118 to function as described herein. In an exemplary embodiment, each current sensor 132 generates one or more signals representative of the measured or detected current (hereinafter referred to as "current signals") flowing through first phase conductor 112, second phase conductor 114, and/or third phase conductor 116, and transmits the current signals to controller 122.

Additional sensor 134, in an exemplary embodiment, measures and/or detects an event of arc flash by, for example, measuring or detecting an amount of light generated, an acoustic pressure generated, a reduction in the voltage of the system, a barometric pressure on one or more predefined planes, and/or a displacement of a cover within equipment protection system 118 generated by arc flash event 120. Additional sensor 134 generates one or more signals representative of the measured or detected quantity (sometimes hereinafter referred to as "sensor signals") and transmits the sensor signals to controller 122.

Controller 122 analyzes the current signals and the signal from the additional sensor 134 to determine and/or detect whether arc flash event 120 has occurred. More specifically, controller 122 compares the additional signals to one or more rules or thresholds to determine whether the additional signals contain indicators of arc flash event 120. If controller 122 determines that arc flash event 120 has occurred based on the additional signals, controller 122 transmits a trip signal to circuit interruption device 128, and transmits an activation signal to arc containment device 130. Circuit interruption device 128 interrupts current flowing through first phase conductor 112, second phase conductor 114, and third phase conductor 116 in response to the trip signal. A trigger unit in arc containment device 130 issues a trigger signal to a plasma generating device to inject plasma between electrodes to generate a secondary arc event diverting the arc energy from equipment protection system 118 to arc containment device 130.

Figure 2:
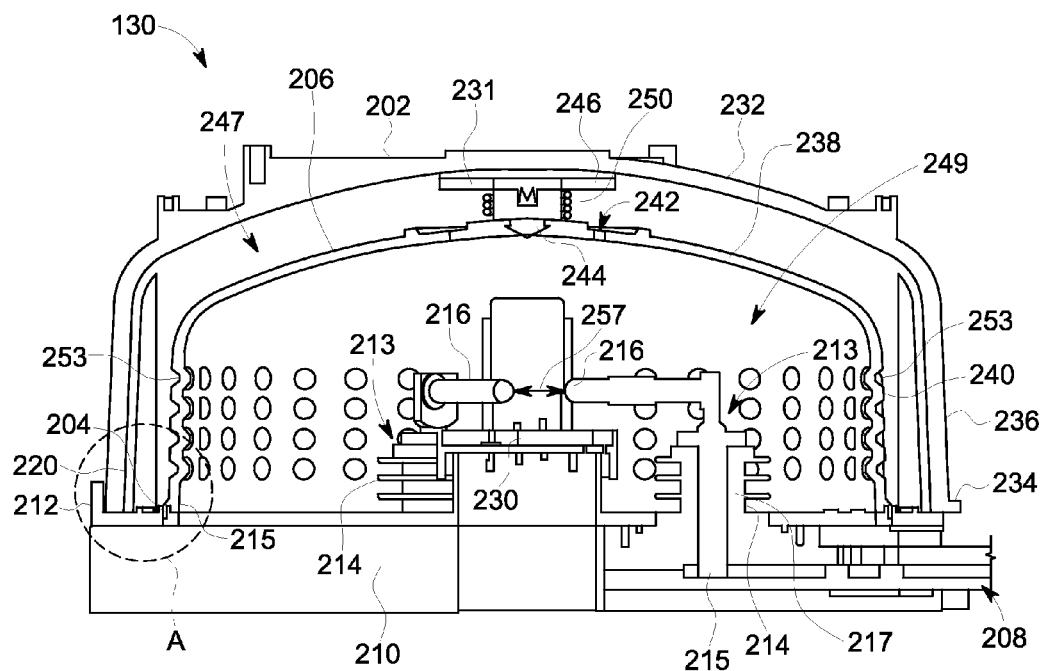
FIG. 2 is a cross-section schematic diagram of an arc containment device to be used with the power distribution system shown in FIG. 1.
Figure 3:
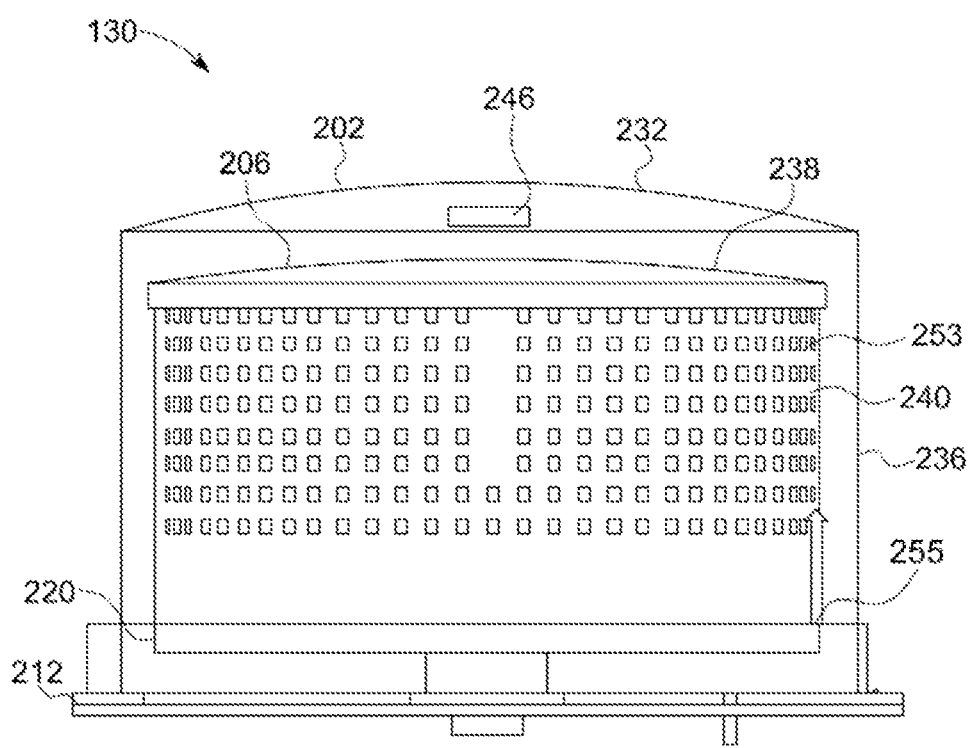
FIG. 3 is a simplified schematic diagram of the exemplary arc containment device shown in FIG. 2.
Figure 4:
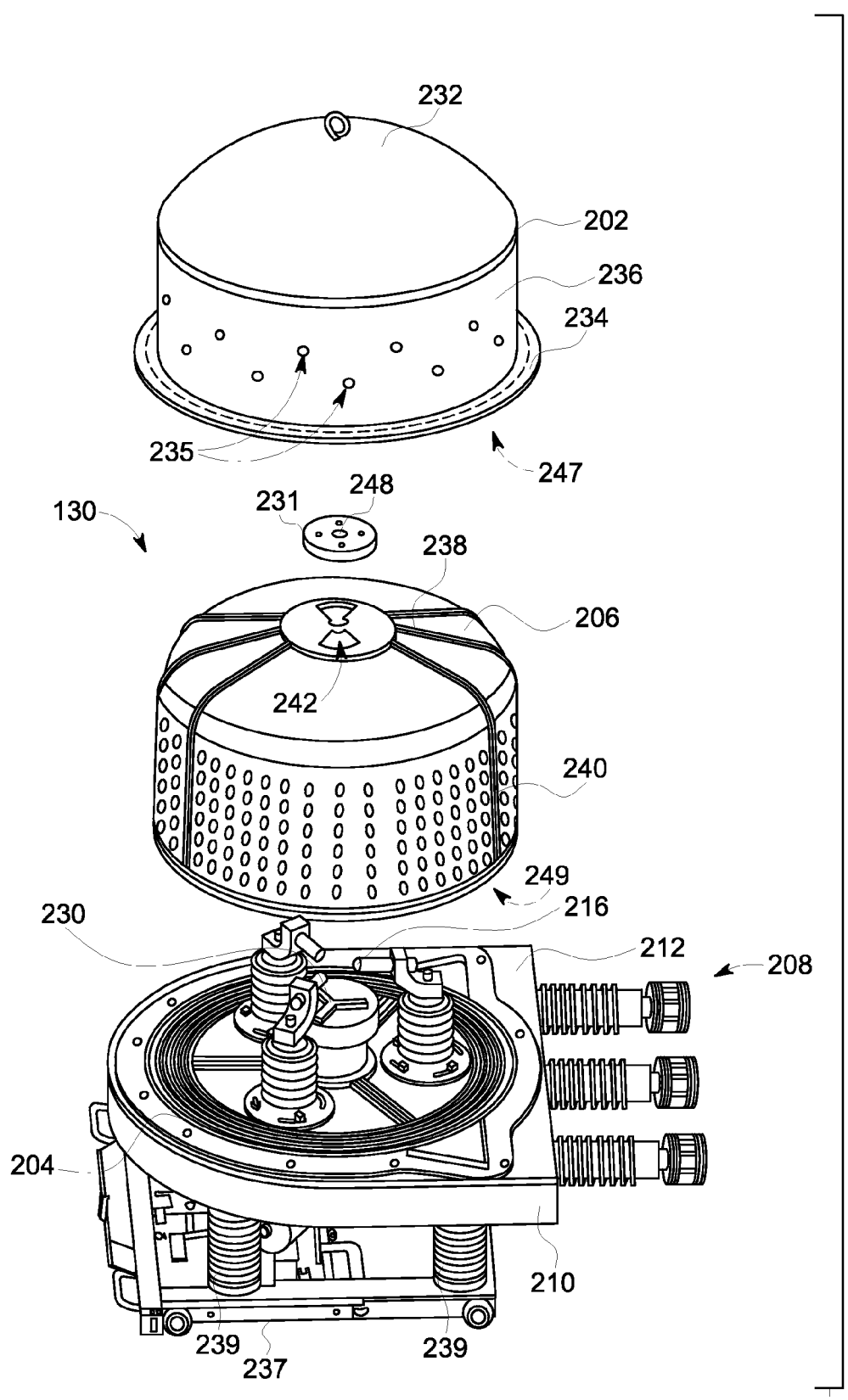
FIG. 4 is an exploded view of the exemplary arc containment device shown in FIG. 2.
Figure 5:
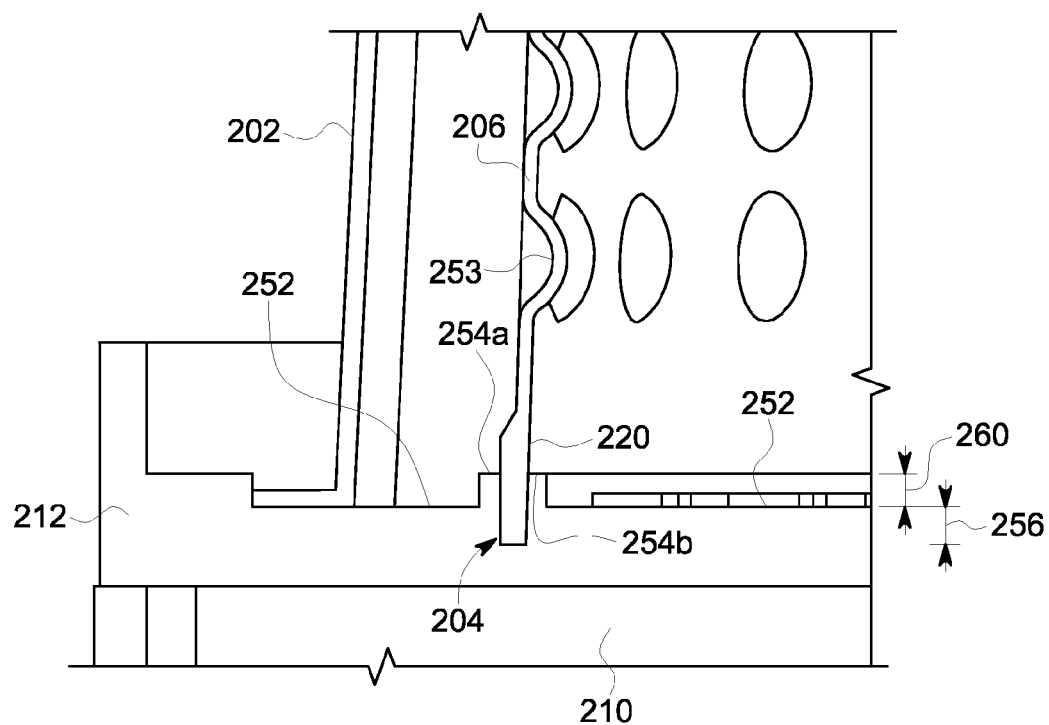
FIG. 5 is a cross-sectional view of portion of the arc containment device shown in FIG. 2.

FIG. 2 is a cross-section schematic diagram of arc containment device 130 and FIG. 3 is a schematic diagram of an exemplary arc containment device 130. FIG. 4 is an exploded view of arc containment device 130 and FIG. 5 is a cross-sectional view of portion A (shown in FIG. 2) of arc containment device 130.

In an exemplary embodiment, arc containment device 130 includes a cover 202, a shock shield 206 (e.g., containment shell, containment shield) (shown in FIGS. 2 and 3), a biasing assembly 246 (shown in FIG. 2), and a conductor assembly 208 (shown in FIGS. 2 and 3).

As shown in FIG. 2, conductor assembly 208 includes a conductor base 210 and a conductor cover 212 with a plurality of insulated electrical conductors (not shown) positioned there-between. Each electrical conductor is coupled to an electrode assembly 213. In the exemplary implementation, system 130 includes a pair of electrode assemblies 213 and a pair of electrical conductors, each electrode assembly 213 is coupled to a different conductor of the pair electrical conductors. More specifically, a first electrode assembly 213 of the pair of electrode assemblies 213 is coupled to a first conductor of the pair of electrical conductors and a second electrode assembly 213 of the pair of electrode assemblies 213 is coupled to a second conductor of the pair of electrical conductors. Other embodiments may include more or fewer electrode assemblies 213 and more or fewer conductors. Each electrode assembly 213 includes an arc source electrode 216 and an electrode support 214. Electrode support 214 has an internal conductor 215. Arc source electrode 216 is mounted rigidly onto internal conductor 215 of electrode support 214. Outer body 217 of the electrode support 214 is made up of an insulating material. Each electrode support 214 is mounted onto the conductor cover 212. Each electrode support 214 is rigidly mounted onto conductor cover 212 and spaced apart to define an electrode gap (not shown) between arc source electrodes 216. Each electrical conductor 215 extends through conductor base 210 to connect electrodes 216 to a power source (not shown), such as a power bus. Conductor base 210 and conductor cover 212 may be made of any suitable electrically insulating material and composites to provide an electrically insulative and mechanical support for electrodes 216, cover 202, and containment shield 206.

An arc triggering device, such as a plasma generating device 230, is disposed proximate gap 257. For example, plasma generating device 230 may be centrally disposed with respect to arc source electrodes 216, and configured to ionize a space in gap 257. In one embodiment, plasma generating device 230 injects plasma and/or a stream of electrons to ionize the space and to weaken dielectric strength of medium, to create a secondary arcing fault in response to a signal indicative of a primary arc flash within the power system coupled to arc containment device 130. In operation, arc source electrodes 216 generate an arc, such as a secondary arc flash, for use in dissipating/diverting energy associated with a primary arc flash detected on a circuit, thus producing hot ionized exhaust gases, heat, acoustic and pressure waves, and/or metal shrapnel (i.e., arc products) within arc containment device 130.

Figure 6:
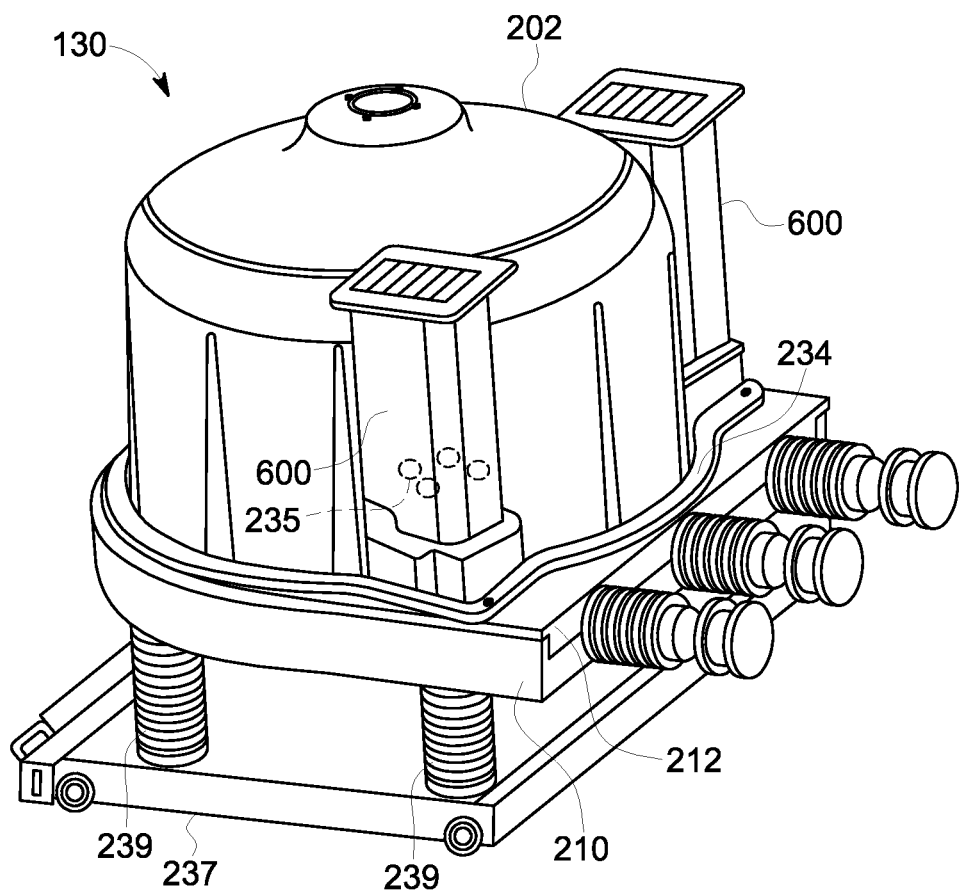
FIG. 6 is another exemplary arc containment device to be used with the power distribution system shown in FIG. 1.

Cover 202 includes a top 232, a lip and/or a flat projection 234, and a side 236 extending between top 232 and lip 234. Lip 234 includes a plurality of mounting apertures (not shown) that are sized to receive a respective fastening mechanism (not shown), such as a threaded bolt, therein to couple cover 202 to conductor base 210 through the conductor cover 212. Top 232 and side 236 generally define an isolation chamber 247 within which electrode assemblies 213 are disposed. Cover 202 is sized to cover shock shield 206 and enclose shock shield 206 within isolation chamber 247. Cover 202 also has openings 235, also referred to as vent holes 248 (shown in FIG. 4), for venting gasses and other arc effluents generated by an arc event in the arc containment device 130. In the illustrated embodiment, vent holes 235 are located on the side 236 of the cover. In other embodiments, vent holes 235 may be located on the top 232 of cover 202. Moreover, venting holes 235 may be located in a single, or more than one location, including being located circumferentially around cover 202. In this exemplary implementation, arc effluents exit cover 202 directly to the environment surrounding cover 202 via vent holes 235. FIG. 6 is an illustration of another embodiment of arc containment device 130 in which arc effluents are channeled out from the equipment protection device 118 using chimneys 600 overlying vent holes 235 (shown in hidden lines). In the embodiment shown in FIG. 6, vent holes 235 are defined in cover 202 at a location behind chimneys 600.

As shown in FIGS. 2 and 3, shock shield 206 is sized to cover electrodes 216, and is disposed over electrodes 216 within isolation chamber 247. Shock shield 206 includes a top 238 and a side 240 that generally define a containment chamber 249 within isolation chamber 247. Electrode assemblies 213 are generally disposed within the containment chamber 249 such that the secondary arc source created by plasma generating device 230 and electrodes 216 is either contained or partially contained within containment chamber 249 by shock shield 206. Moreover, charged particles and other arc products, such as high intensity pressure waves, high temperatures, metal shrapnel, gases, and/or light, are contained or partially contained within containment chamber 249. A plurality of exhaust vents 242 are formed in top 238 of shock shield 206. In other embodiments, vents 242 are located on side 240 of shock shield 206.

Biasing assembly 246 is positioned between cover 202 and shock shield 206. Biasing assembly 246 generally couples cover 202 to shock shield 206, biases shock shield 206 away from cover 202, biases shock shield 206 against conductor base 210, permits shock shield 206 to move relative to cover 202, maintains alignment between shock shield 206 and cover 202 when shock shield 206 moves relative to cover 202, and/or facilitates variable venting of at least some arc products from containment chamber 249. In the exemplary implementation, biasing assembly 246 is coupled to cover 202 and shock shield 206. In other implementations, isolation assembly may be coupled to only one of cover 202 and shock shield 206. Biasing assembly 246 prevents direct contact and electrical coupling between cover 202 and shock shield 206. Charged particles generated within the containment chamber 249 during the secondary arc event are thereby prevented from coupling to cover 202. Biasing assembly 246 includes an alignment post 244 (FIG. 2) located in the center of shock shield 206 and coupled shock shield 206. An insulator disk 231 is mounted to the center of top 232 of cover 202 with a plurality of fastening mechanisms. Insulator disk 231 is constructed of an electrically insulative material and contains an aperture 248 (shown in FIG. 4) sized to receive alignment post 244, thereby enabling the slidable coupling of shock shield 206 to cover 202. Thus, shock shield 206 is operative to move relative to cover 202 in response to changes in pressure produced by an arc within the containment chamber 249.

A biasing member 250 biases shock shield 206 in a direction away from top 232 of cover 202. In one embodiment, biasing member 250 is a spring. In other embodiments, biasing member 250 is a damper, a flexible component, a compressible material, a foldable shock shield with a stiff stopper mechanism, or any other suitable type of biasing member. In the event that an opposing and stronger force is applied to shock shield 206 and associated biasing component 250, shock shield 206 and attached alignment post 244 slide parallel with the alignment post such that alignment post 244 remains within aperture 248 as shock shield 206 moves away from conductor base 210 and toward cover 202.

Biasing assembly 246 houses alignment post 244 and biasing component 250 and acts as a guide for movement of shock shield 206 during an arc event. Biasing assembly 246 prevents contact between shock shield 206 and cover 202. Ground strike current is eliminated by avoiding contact between shock shield 206 and cover 202. Additionally, arc mitigation system 130 is mounted on top of a movable mounting platform 237 using insulators 239. In use, arc containment system 130 may be mounted in an equipment cabinet or rack (not shown). Moveable mounting platform 237 permits arc containment system 130 to be moved relative to the rack on which it is mounted. In an installed/in use position relative to the rack, arc containment system 130 may be at least partially enclosed and inaccessible. Moveable mounting platform 237 permits arc containment system 130 to be moved out of the rack to a position permitting access to arc containment system 230 without disconnecting arc containment system 130 from the rack. Movable mounting platform 237 is at ground potential. Insulators 239 are selected for the system dielectric requirements. This arrangement breaks the grounding path from arc containment system 130 to the rack due to insulators 239. The over surface path length from cover 202 mounting location to insulators 239 enhances the dielectric strength of the device and avoids the formation of ground path due to creepage. By preventing mounting platform 237 from being electrically coupled to arc containment system 130, the grounding path of device 130 can be avoided and/or controlled, and operators coming in contact with mounting platform 237 during an arc flash event are protected from the high current of the arc. The mounting mechanism on insulators 239 and insulator disc mechanism 230 may prevent any occurrence of a ground strike fault during an arc flash.

An annular groove 204 is defined in a portion of conductor cover 212. Annular groove 204 extends from an upper surface 252 of conductor cover 212 toward conductor base 210 within conductor cover 212. In the exemplary embodiment, groove 204 has a depth 256 (i.e., distance) of approximately 0.5 inches. In the exemplary embodiment, groove 204 extends toward a portion of conductor cover 212 that is positioned a predetermined distance 256 from conductor base 210. Also, groove 204 is partially defined by two spaced apart projections 254a and 254b that extend away from surface 252 a distance 260. Distance 256 and distance 260 can have any suitable value. Groove 204 is configured to receive bottom portion 220 of side surface 240 of shock shield 206, such that flue gases within containment chamber 249 cannot escape when shock shield 206 is biased away from cover 202 and toward conductor cover 212. When the pressure created by flue gases within containment chamber 249 is sufficient to cause shock shield 206 to slide parallel with alignment post 244 in a direction away from conductor cover 212, side surface 240 of shock shield 206 moves out of groove 204 creating a gap between bottom portion 220 and groove 204 through which that flue gases within the containment chamber 249 are able to escape. The movable shock shield 206 acts like a shock absorber by moving away from and towards the conductor cover 212 according to pressure variation within containment chamber 249. Movement helps in shock wave dampening. Due to the dampened shock wave, the resultant forces on one or more clamping bolts which connect the cover to the conductor base are reduced and resultant load on the structure is minimized.

The distance of displacement of shock shield 206 is a function of pressure contained within shock shield 206 and the vertically opposing force provided on shock shield 206 by biasing component 250. Shock shield 206 pressure is also a function of arc current and the arc duration. Higher arc curerents produce greater pressures within containment chamber 249. In order to provide enhanced venting at higher currents (e.g., higher pressures within containment chamber 249), shock shield 206 is able to move towards and away from conductor cover 212 (or conductor base 210) to release gases from bottom portion 220 of shield 206. However, too much additional venting may create a problem of arc sustenance in the case of lower arc current due to poor containment of gases. Excess venting of flue gasses away from electrodes 216, results in insufficient amounts of ions/charged particles in the space between electrodes 216 to maintain the secondary arc until the upstream circuit component clears the fault. Deionization increases dielectric strength and extinguishes the arc in the arc chamber, resulting in arc restrikes at the primary arc fault location. Thus, the exemplary design of using biasing component 250 between shock shield 206 and cover 202 will result in a variable venting arrangement.

In the case of low current arcs, the pressure of gases may not be sufficient to move shock shield 206 due to the bias pressure applied to shield 206 by spring 250. In contrast, in the case of high current arcs, the higher pressure of gases may be sufficient to oppose the force of the biasing component 250 and cause the shock shield 206 to move away from conductor cover 212, as biasing component 250 compresses and gases are vented through a space created between the bottom 220 of shock shield 206 and annular groove 204. Because some of the shock of the creation and presence of gases resulting from the arc are reduced by shock shield 206 and associated biasing component 250, the clamping requirements for attaching the cover 202 to the conductor cover 212 are reduced. In addition to providing a variable vent, biasing component 250 produces a bias which keeps shock shield 206 in place, such that bottom portion 220 remains within groove 204 and conductor cover 212. Thus, for example, vibrations caused by movement of arc containment system 130 and vibrations induced in arc containment system 130 do not displace shock shield 206 and thereby do not unintentionally vent containment chamber 249. Moreover, if shield 206 is not kept in its proper location, clearance from electrodes 216 to shock shield 206 will not be consistent, causing deterioration of dielectric performance of arc containment device 130.

Selection of biasing component 250 stiffness is made to suit the venting requirements as related to the arc current rating of arc containment device 130. For example, an arc containment device 130 having a high arc current rating will use a stiffer biasing component 250 than an arc containment device 130 having a low arc current rating. An exemplary distance 255 that shock shield 206 lifts during an arc event is shown in FIG. 3. With the suitable selection of the biasing component 250 the rating of the device can be extended in either direction in magnitude.

In the exemplary embodiment, shock shield 206 has a plurality of structural formations 253, such as bubbles, dimples, aberrations etc., to diffuse the reflections from the shock pressure generated by an arc event and/or reduce a shock pressure wave within containment chamber 249 generated by an arc event. These mechanical formulations 253, reduce the magnitude of shock wave pressure due to arc event in containment device 130. Thereby, the mechanical formulations 253 reduce the clamping requirements for attaching the cover 202 to the conductor cover 212.

During operation, controller 122 (shown in FIG. 1) analyzes the current signals and the sensing signals to determine and/or detect whether arc flash event 120 has occurred. In response to the detection, controller 122 (shown in FIG. 1) causes plasma generating device 230 (shown in FIG. 2) to emit a plume of an ablative plasma. Specifically, plasma generating device 230 emits the plasma into gap 257 (shown in FIG. 2) defined between arc source electrodes 216 (shown in FIG. 2). The plasma lowers an impedance between the tips of electrodes 216 to enable formation of a secondary arc flash. The secondary arc flash releases energy including heat, pressure, acoustic wave, metal shrapnel, light, and/or sound (i.e., arc products). The exhaust gases are channeled through bottom portion 220 of shock shield 206 as it moves away from the conductor cover 212 due to the accumulation of gases.

The distance and speed at which shock shield (i.e., containment shield) 206 moves in relation to conductor cover 212 is controlled by one or more biasing components 250 placed about a top surface 238 of containment shield 206. According to the exemplary embodiment, containment shield 206 is configured to move approximately 0.5 inches away from the conductor cover 212 to allow gases generated by the arc to escape through a gap between the containment shield 206 and the conductor cover 212.

Figure 7:
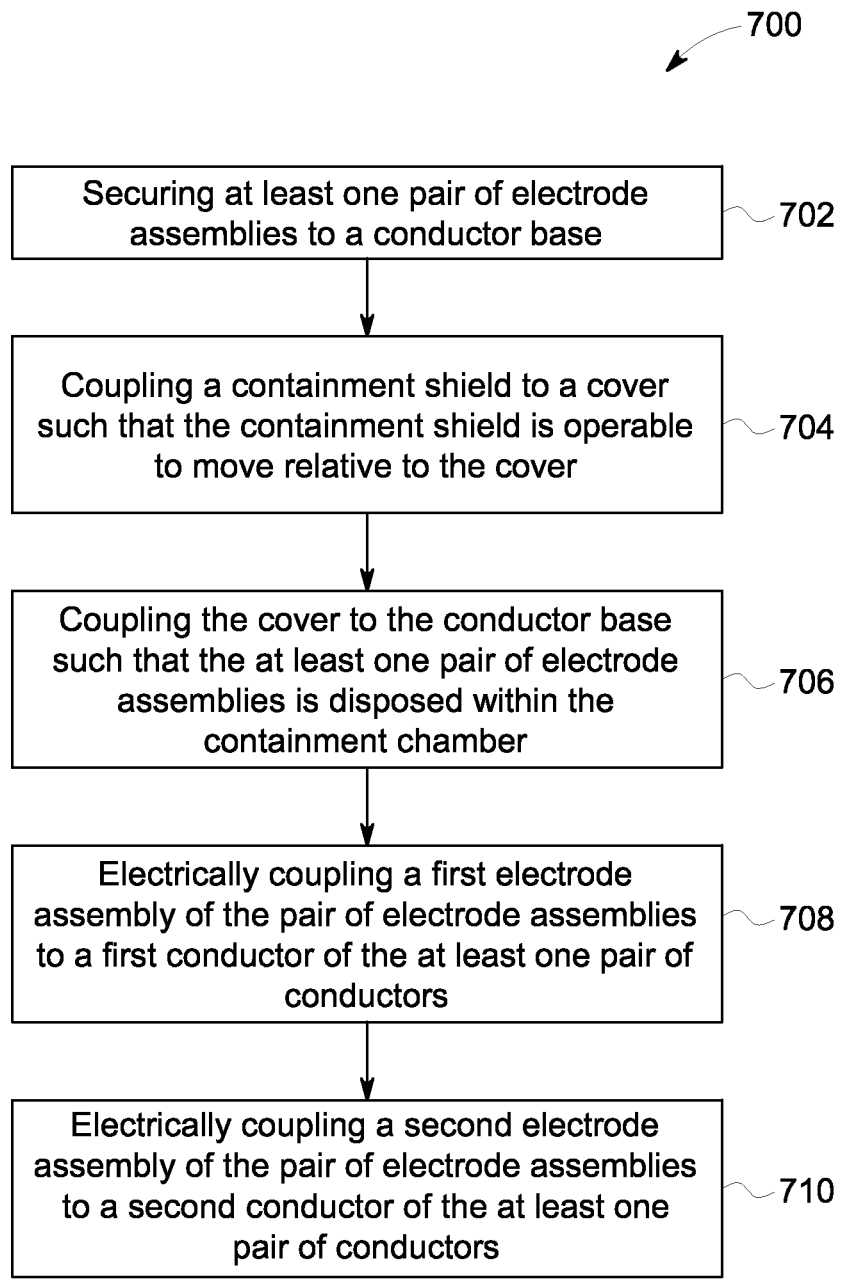
FIG. 7 is a process flow diagram of a method of assembling an arc containment device shown in FIG. 2.

As shown in FIG. 7, a method 700 of assembling a circuit protection device includes securing 702 at least one pair of electrode assemblies to a conductor base. A plasma generating device is coupled to a conductor cover. A containment shield defining a containment chamber is coupled 704 to the cover such that the containment shield is operable to relative to the cover to create a gap between the containment shield and the conductor base to vent gasses produced by an arc within the containment chamber. The method includes coupling 706 the cover to the conductor base such that the at least one pair of electrode assemblies is disposed within the containment chamber. A first electrode assembly of the at least one pair of electrode assemblies is electrically coupled 708 to a first conductor of the at least one pair of conductors. A second electrode assembly of the at least one pair of electrode assemblies is electrically coupled 710 to a second conductor of the at least one pair of conductors.

Exemplary embodiments of apparatus for use in devices for protection of power distribution equipment are described above in detail. The apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power distribution environment, embodiments of the invention are operational with numerous other general purpose or special purpose power distribution environments or configurations. The power distribution environment is not intended to suggest any limitation as to the scope of use or functionality of any aspect of the invention. Moreover, the power distribution environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device for use with a circuit that includes at least one pair of conductors, said circuit protection device configured to generate an arc, the arc generating arc products including arc gases, said circuit protection device comprising:
   at least one pair of electrode assemblies, a first electrode assembly of the pair of electrode assemblies electrically coupled to a first conductor of the at least one pair of conductors, and a second electrode assembly of the pair of electrode assemblies electrically coupled to a second conductor of the at least one pair of conductors, said at least one pair of electrode assemblies configured to generate the arc;
   a conductor base for mounting said electrode assemblies thereon;
   a cover coupled to said conductor base and defining at least one isolation chamber, wherein said pair of electrode assemblies is disposed within said at least one isolation chamber;
   a containment shield disposed on said conductor base within the isolation chamber, said containment shield defining a containment chamber enclosing said at least one pair of electrode assemblies, said containment shield configured to at least partially contain arc products within the containment chamber; and
   a biasing assembly positioned between said cover and said containment shield and coupled to at least one of said cover and said containment shield, said biasing assembly configured to permit said containment shield to move away from said conductor base to thereby define a gap between said conductor base and said containment shield to enable at least some of the arc gases to vent from the containment chamber.

2. A circuit protection device in accordance with claim 1, wherein said biasing assembly comprises at least one biasing member configured to control a distance and speed at which said containment shield moves away from said conductor base.

3. A circuit protection device in accordance with claim 1, wherein said cover comprises a plurality of vents located circumferentially thereon and configured to vent at least some of the arc gases from the at least one isolation chamber.

4. A circuit protection device in accordance with claim 1, further comprising at least one chimney coupled to said cover, wherein said cover comprises at least one vent configured to vent at least some of the arc gases from the at least one isolation chamber, and wherein said at least one chimney overlies the at least one vent.

5. A circuit protection device in accordance with claim 1, wherein said conductor base comprises an annular groove configured to receive a bottom portion of said containment shield.

6. A circuit protection device in accordance with claim 1, wherein said biasing assembly is configured to reduce transport related displacements of said containment shield.

7. A circuit protection device in accordance with claim 1, wherein said biasing assembly comprises at least one biasing member configured to provide a bias force to bias said containment shield away from said cover.

8. A circuit protection device in accordance with claim 6, wherein said containment shield comprises at least one mechanical formation configured to reduce a shock pressure wave within said containment chamber.

9. An electrical isolation structure for use with an arc mitigation device that includes a plurality of electrode assemblies each having an electrode configured to produce an arc, the arc generating arc products including arc gases, said electrical isolation structure comprising:
   a conductor base;
   a cover coupled to said conductor base and defining an isolation chamber therebetween; and
   a containment shield disposed on said conductor base within the isolation chamber, said containment shield defining a containment chamber configured to enclose the plurality of electrode assemblies, said containment shield configured to at least partially contain arc products within the containment chamber; and
   a biasing assembly positioned between said cover and said containment shield and coupled to at least one of said cover and said containment shield, said biasing assembly configured to permit said containment shield to move away from said conductor base to thereby define a gap between said conductor base and said containment shield to enable at least some of the arc gases to vent from the containment chamber.

10. An electrical isolation structure in accordance with claim 9, wherein said biasing assembly comprises at least one biasing member configured to control a distance and speed at which said containment shield moves away from said conductor base.

11. An electrical isolation structure in accordance with claim 9, wherein said biasing assembly to permit said containment shield to move 0.5 inches away from said conductor base.

12. An electrical isolation structure in accordance with claim 9, wherein said conductor base comprises an annular groove configured to receive a bottom portion of said containment shield.

13. An electrical isolation structure in accordance with claim 9, wherein said biasing assembly comprises at least one biasing member configured to provide a bias force to bias said containment shield away from said cover.

14. An electrical isolation structure in accordance with claim 13, wherein said containment shield is slideably coupled to said cover by said biasing assembly to permit said containment shield to move relative to said cover.

15. A method of assembling a circuit protection device for use with a circuit that includes at least one pair of conductors, wherein said circuit protection device includes a conductor base, a containment shield defining a containment chamber, a cover, and at least one pair of electrode assemblies configured to produce an arc, the arc generating arc products including arc gases, said method comprising:
   securing the at least one pair of electrode assemblies to the conductor base;
   coupling the containment shield to the cover such that the containment shield is operable to move relative to the cover to define a gap between the containment shield and the conductor base to vent arc gases from the containment chamber;
   coupling the cover to the conductor base such that the at least one pair of electrode assemblies is disposed within the containment chamber and the containment shield is disposed on the conductor base;
   electrically coupling a first electrode assembly of the pair of electrode assemblies to a first conductor of the at least one pair of conductors; and
   electrically coupling a second electrode assembly of the pair of electrode assemblies to a second conductor of the at least one pair of conductors.

16. A method of assembling a circuit protection device in accordance with claim 15, wherein coupling the containment shield to the cover comprises coupling the containment shield to the cover with a biasing assembly comprising at least one biasing member configured to control a distance and speed at which said containment shield is operable to move relative to said cover.

17. A method of assembling a circuit protection device in accordance with claim 15, wherein coupling the containment shield to the cover comprises coupling the containment shield to the cover such that the containment shield is operable to move 0.5 inches in a direction towards said cover.

18. A method of assembling a circuit protection device in accordance with claim 15, wherein coupling the cover to the conductor base comprises coupling the cover to a conductor base comprising an annular groove configured to receive a bottom portion of the containment shield.

19. A method of assembling a circuit protection device in accordance with claim 18, wherein coupling the cover to the conductor base comprises coupling the cover to the conductor base with a biasing assembly and with the bottom portion of the containment shield disposed within the annular groove, the biasing assembly configured to permit the containment shield to move away from the conductor base to define a gap between the annular groove and the containment shield to vent at least a portion of the arc gases from the containment chamber.

20. A method of assembling a circuit protection device in accordance with claim 15, coupling the containment shield to the cover comprises slidably coupling the containment shield to the cover with a biasing assembly.

\* \* \* \* \*

UNITED STATES PATENT AND TRADEMARK OFFICE
CERTIFICATE OF CORRECTION

| | |
|---|---|
| PATENT NO. | : 8,993,916 B2 |
| APPLICATION NO. | : 13/707845 |
| DATED | : March 31, 2015 |
| INVENTOR(S) | : Palvadi et al. |

Page 1 of 1

It is certified that error appears in the above-identified patent and that said Letters Patent is hereby corrected as shown below:

Specification

In Column I, Line 15, delete "dielectic" and insert -- dielectric --, therefor.

In Column 8, Lines 34-35, delete "system 230" and insert -- system 130 --, therefor.

In Column 9, Lines 19-20, delete "arc curerents" and insert -- arc currents --, therefor.

Signed and Sealed this
Twenty-seventh Day of October, 2015

Michelle K. Lee
*Director of the United States Patent and Trademark Office*